455-296 SR CROSS REFERENCE SEARCH ROOM
FIP8106 XR 3,226,646

Dec. 28, 1965 D. R. LUDWIG 3,226,646

INTERFERING RADIO SIGNAL CANCELLING BRIDGE

Filed May 8, 1962 3 Sheets-Sheet 1

INVENTOR.
David R. Ludwig
BY Walter J. Kreske
ATTORNEY.

Dec. 28, 1965 D. R. LUDWIG 3,226,646

INTERFERING RADIO SIGNAL CANCELLING BRIDGE

Filed May 8, 1962 3 Sheets-Sheet 2

INVENTOR.
David R. Ludwig
BY Walter J. Kreske
ATTORNEY.

Dec. 28, 1965 D. R. LUDWIG 3,226,646

INTERFERING RADIO SIGNAL CANCELLING BRIDGE

Filed May 8, 1962 3 Sheets-Sheet 3

INVENTOR.
David R. Ludwig

BY Walter J. Kreske
ATTORNEY.

3,226,646
INTERFERING RADIO SIGNAL CANCELLING BRIDGE

David R. Ludwig, Braintree, Mass., assignor to General Electronic Laboratories Inc., Cambridge, Mass., a corporation of Massachusetts Filed May 8, 1962, Ser. No. 193,147
9 Claims. (Cl. 325—475)

This invention relates to radio systems for the cancellation of interference signals appearing in the same frequency bands as desired information signals without destroying the desired information signal, and more particularly to electronic bridge type structures for the cancellation of such interfering signals.

The present invention is particularly applicable to receivers for frequency modulation, continuous wave, amplitude modulation or pulse type information signals where the desired information signals are the weaker of two incoming signals and where the stronger, interfering signal is a frequency modulation phase modulation or continuous wave signal. The invention is also applicable where the stronger interfering signal is an AM signal in which event cancellation of the carrier is achieved. In actual practice over 30 db cancellation of the interfering stronger signal is achieved in frequency modulation, phase modulation continuous wave signals and for the amplitude modulation carrier almost 100% cancellation may be achieved.

A primary object of the present invention is the provision of a bridge type interference signal cancelling system which achieves a very high degree of cancellation of the undesired interfering signal without significant deterioration of the desired weaker signal.

Another object is the provision of a bridge type system particularly adaptable for cancelling frequency modulation, continuous wave and phase modulation interfering signals.

And a further object is the provision of a bridge type interference signal cancellation system for use in receiving frequency modulation, continuous wave, phase modulation or amplitude modulation information signals.

Another object is the provision of a bridge type interfering signal cancellation system which is highly stable in its operation.

And a further object is the provision of a bridge type interference signal cancellation system which required no adjustment for varying intensities of interfering signals.

Another object is the provision of an interference signal cancellation system which is operable for relative levels of the undesired interfering signal to the desired information signal in the same frequency band of ½ db and 30 db and a much greater spread of relative levels where the interfering signal and desired signal are in different frequency bands.

A further object is the provision of an interfering signal cancelling bridge type system which is particularly adapted for operation with an intermediate frequency amplifier over the entire radio frequency range of the receiver and which may be used with any receiver adapted for any frequency range, including microwave.

And a still further object is the provision of a bridge type interfering signal cancelling system particularly applicable in the intermediate frequency band of a receiver.

These and other objects, features, and advantages are achieved generally by the provision of a parallel arrangement of an interference signal tracking filter and a linear response intermediate frequency gain amplifier, each having an input and an output with the inputs coupled to the output of an intermediate frequency amplifier of a receiver, and the outputs of the interference signal tracking filter and linear response intermediate frequency gain amplifier coupled to a signal subtracting circuit whose output is fed to a final demodulator for demodulating the desired information signal. The tracking filter is arranged to isolate the undesired interference signal which is then fed to the subtraction circuit to which is also fed through the linear gain amplifier, both the desired information signal and the undesired interference signal and at which the undesired interference signal is then cancelled and the desired weaker signal fed from the subtraction circuit to the demodulator.

By making the interference signal tracking filter in the form of an electronically tunable narrow band filter in control relation to which is coupled a guidance circuit responsive to the undesired interference signal output of the intermediate frequency amplifier, effective tracking is achieved.

By making the interference signal tracking filter in the form of an electronically tunable narrow bandpass filter of constant bandwidth with capacity for electronically controlling the position of the center frequency, and providing a control circuit in responsive relation to the intermediate frequency amplifier output and in control relation to the electronically tunable filter a suitable arrangement is achieved for varying the center frequency at the filter to align the center frequency with the instantaneous frequency of the undesired interference signal at every instant.

By providing a signal delay arrangement interposed between the intermediate frequency amplifier and the electronically tunable filter and having a time delay corresponding to the time delay of the control circuit, the coincidence of the undesired interference signal frequency and the center frequency of the electronically tunable filter is thereby assured.

By making the control circuit in the form of a high capture demodulator for the undesired stronger signal and an analog shaping circuit for the output of the demodulator and in control relation to the electronically tunable filter, effective tracking control of the electronically tunable filter is thereby achieved and suitable compensation of any non-linearity in the tuning characteristics of the electronically tunable filter is readily provided for.

By providing a phase comparator for comparison of the phase of the undesired interference signal both before and after the electronically tunable filter and having capacity for generating a correction signal to the analog shaping circuit, a suitable arrangement for correcting any slight mistracking of the electronically tunable tracking filter is thereby achieved.

These and other features and advantages of the invention will become more apparent from the following description taken in connection with the accompanying drawings of a preferred embodiment of the invention and wherein.

Figure 1:
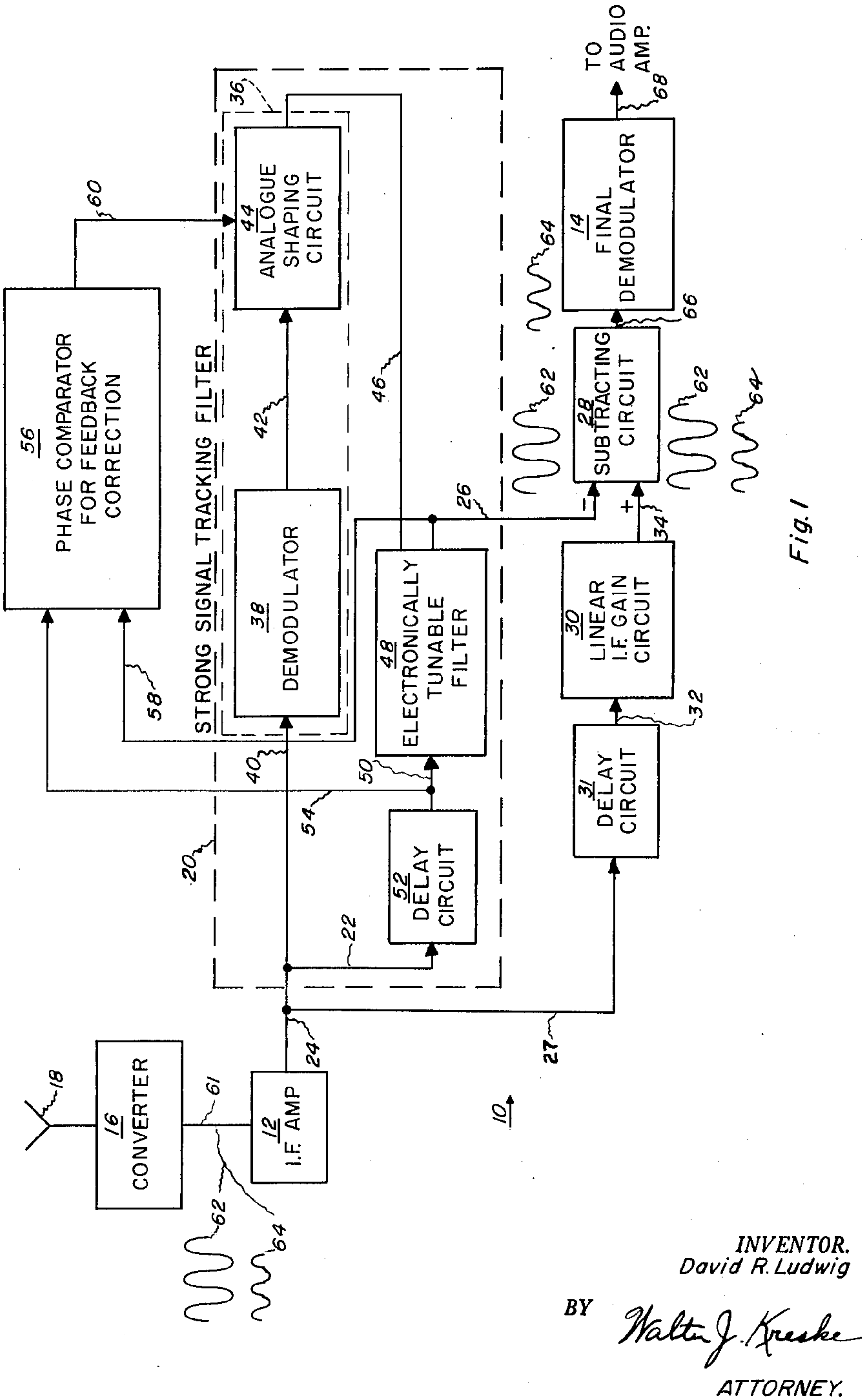
FIG. 1 is a block diagram of the preferred embodiment of the invention.

Referring to FIG. 1 in more detail, the preferred embodiment of an interfering signal cancelling bridge made in accordance with the present invention is designated generally by the numeral 10. The bridge 10 is particularly adapted for interposing between a conventional intermediate frequency amplifier 12 and a final demodulator 14 in a conventional receiver having in the present instance additionally a converter 16 which is fed by an antenna 18. It should be understood here that while the receiver being described will be described in terms of a frequency modulation receiver, the system is applicable to and may be also used with amplitude modulation receivers in substantially the same manner.

The interfering signal cancelling bridge 10 is comprised of a strong or interference signal tracking filter 20 coupled through line 24 to the output of the IF amplifier 12 and through line 26 to one input of a signal subtraction circuit 28. The interference signal cancelling bridge 10 also includes a linear intermediate frequency gain amplifier 30 coupled in parallel with the stronger signal tracking filter 20 by a connection from line 24 and line 27 through a signal delay circuit 31 and line 32 to linear IF gain circuit 30 from which an output line 34 is coupled to the input side of the subtraction circuit 28.

The stronger or interference signal tracking filter 20 has a tracking control circuit 36 which includes a high capture frequency modulation demodulator 38 whose input side is coupled to the line 24 and whose output side is coupled through a line 42 to an analog shaping circuit 44. The analog shaping circuit 44 has an output control signal line 46 coupled in control relation to an electronically tunable filter circuit 48. The electronically tunable filter 48 has its output side coupled to line 26 and its input side coupled through line 50, a delay circuit 52 and a line 22 to the line 24 from the IF amplifier 12.

Line 50 is also coupled through a line 54 to one input of a phase comparator for feedback correction circuit 56 and line 26 is coupled through a line 58 to another input of the phase comparator circuit 56. The phase comparator circuit 56 also has an output line 60 coupled to the analog shaping circuit 44 for feeding a correction signal thereto.

In the operation of the embodiment shown in FIG. 1, two radio frequency signals of different intensities are picked up by antenna 18 and made to appear from the converter 16 in line 61 as the intermediate frequency signals 62 and 64 wherein 62 is the higher intensity or stronger undesired interfering signal and 64 is the lower intensity or weaker desired information signal.

After suitable amplification in the IF amplifier 12, the signals 62 and 64 are fed through line 24 to the stronger signal tracking filter 20 and the linear IF gain amplifier 30 respectively. Thereby the output of the linear IF gain amplifier 30 will carry in line 34 the two signals 62 and 64 suitably amplified and at the same relative intensity ratios. The same signals will also appear from the delay circuit 52 through line 22 at the electronically tunable filter 48. They will also appear through line 40 at the input of the demodulator 38 where, because the demodulator is of a high signal capture type, the output of the demodulator 38 will carry an analog voltage determined by and comparable to the instantaneous frequency of the stronger signal 62, which analog signal will appear through line 42 at the analog shaping circuit 44. The analog shaping circuit 44 is designed to compensate for nonlinearities in control characteristics of the electronically tunable filter 48 so that the output of the analog shaping circuit 44 through line 46 will control the instantaneous center frequency of the electronically tunable filter in manner to make it coincide with the frequency of the undesired stronger signal 62 appearing through line 50 in the electronically tunable filter 48. Thereby the output of the electronically tunable filter 48 will be selective in passing through output line 26 only signal 62 which thereby appears through line 26 at one input of the subtraction circuit 28. At the same time both the undesired signal 62 and the desired smaller intensity information signal 64 will appear through line 34 at the other input terminal of the subtraction circuit 28. The subtraction circuit 28 is so arranged that the signal 62 from line 26 and the signal 62 from line 34 are of equal amplitude 180° out of phase and so as to effectively cancel the undesired signal 62 and to pass the desired information signal 64 substantially undeteriorated through line 66 to the final demodulator 14 where the desired information signal 64 is demodulated and passed through an output line 68 to suitable audio or video circuitry (not shown).

While in most instances, particularly at low modulating frequencies, a refinement by use of a phase comparator for feedback correction 56 may not be needed, in those instances where high refinement is desired and particularly where high frequency modulation signals are involved, it may be desirable to provide a phase comparator circuit 56 which compares the phase of the signal 62 in line 58 with the signal 62 in line 54 and creates thereby a correction analog voltage in line 60 which is fed to the analog shaping circuit 44. This construction thereby provides a stabilizing closed loop to correct for any small discrepancies between the center frequency of the electronically tunable filter 48 and the instantaneous frequency of the undesired signal 62 appearing through line 50 at the input of the electronically tunable filter 48.

Figure 2:
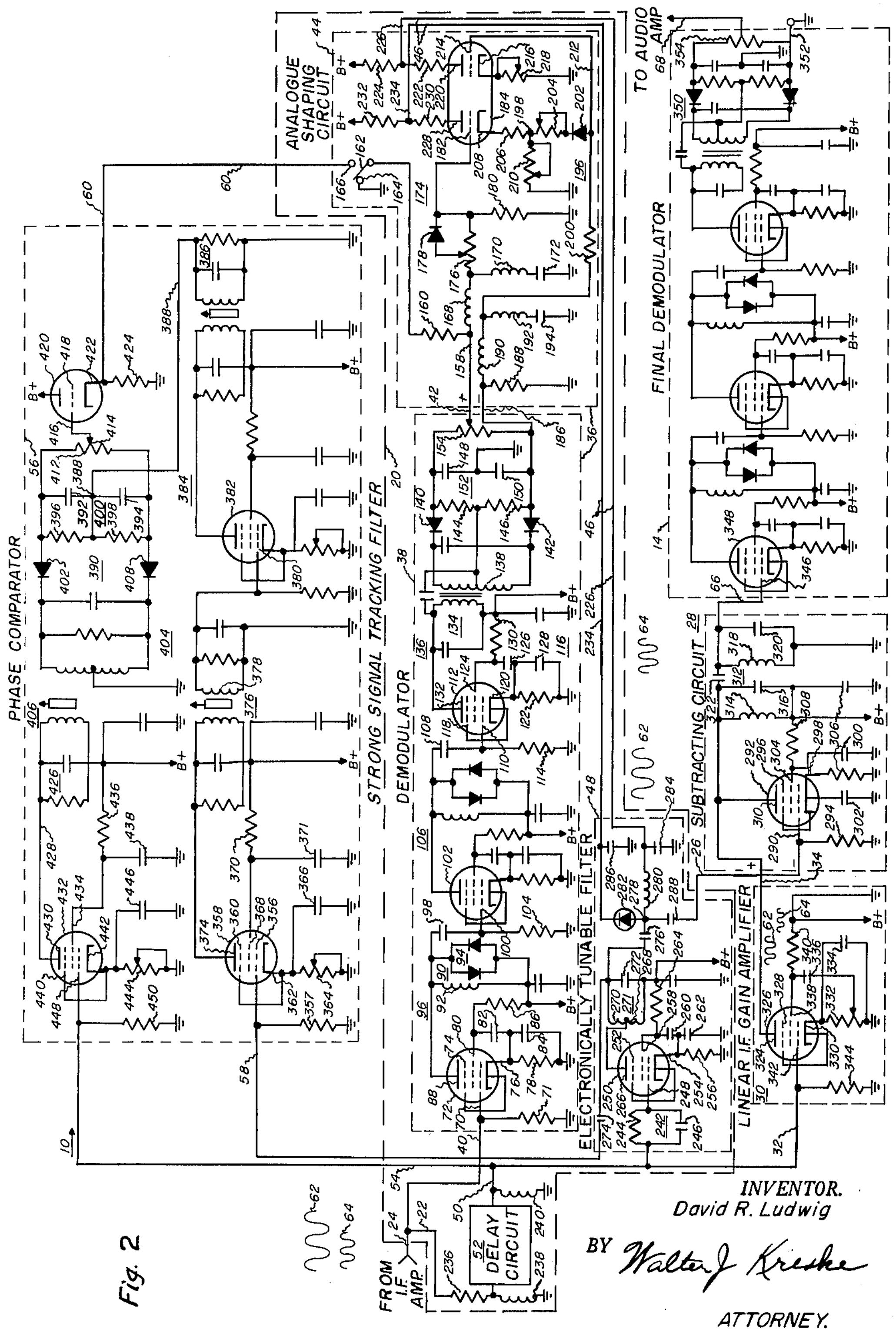
FIG. 2 is a schematic diagram of the circuits shown in block form in FIG. 1.

Referring to FIG. 2 in more detail, therein are schematically illustrated suitable circuits for use in the FIG. 1 embodiment. In FIG. 2 the undesired stronger signal 62 and desired weaker information signal 64 from the output of the IF amplifier 12 (not shown in FIG. 2) appears through line 24 and line 40 at a control grid 70, a pentode 72, in the demodulator circuit 38. The control grid 70 is also coupled through a grid leak resistor 71 to ground. The pentode 72 has a suppressor grid 74 tied back to a cathode 76 which is coupled through a resistor 78 to ground. Pentode 72 also has a screen grid 80 coupled through bypass capacitors 82 and 84 to ground and through a resistor 86 to B+. The pentode 72 also has an anode 88 coupled to one side of a tank circuit 90 comprised of an inductor 92 and back-to-back diode configuration 94 in parallel with the other side coupled to B+. The pentode 72 and tank circuit 90, with associated circuitry as shown and described, comprise a first limiter stage 96 in the demodulator 38. The first limiter stage 96 is coupled through a coupling capacitor 98 to control grid 100 of a pentode 102 and a grid leak resistor 104 to ground in a second limiter stage 106 which may be the same in configuration to the limiter stage 96. The second limiter stage 106 is coupled through a coupling capacitor 108 to a control grid 110 of a third pentode 112 and through a grid leak resistor 114 to ground in a discriminator driver circuit 116. Pentode 112 also has a suppressor grid 118 tied back to a cathode 120 which is coupled through a cathode resistor 122 to ground. The pentode 112 also has a screen grid 124 coupled through bypass capacitors 126 and 128 to ground and through a screen dropping resistor 130 to B+. The pentode 112 also has a plate 132 coupled to one side of a tuned primary 134 of a discriminator transformer 136 to each end of the tuned secondary 138 of which is coupled a diode 140 and 142 respectively which are coupled to each end of parallel connected resistors 144 and 146 and capacitors 148 and 150 forming a balanced output discriminator filter 152.

The output of the filter 152 has coupled across it a potentiometer 154 from which is taken the output balanced lines 42. It should be understood here that while the demodulator 138 here described for illustrative purposes consists of two stages of limiters 96 and 106 and a discriminator driver circuit 116 driving discriminator transformer 136 other kinds of demodulators may also be used. Such demodulators should preferably have good signal capture characteristics and a balanced output.

Figure 3:
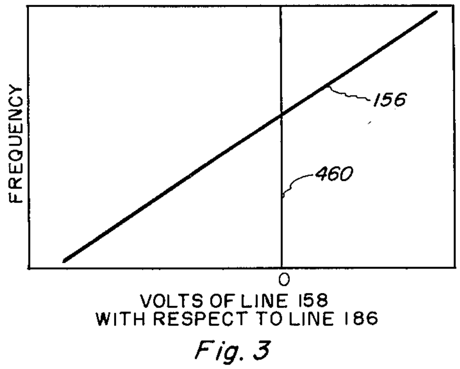
FIGS. 3, 4, 5, 6 and 7 are graphs to more clearly describe operation and construction of the invention.

The demodulator 38 has a linear voltage output characteristic with respect to input frequency, shown by line 156 in FIG. 3.

The balanced output lines 42 having positive side 158 coupled through a balance determining resistor 160 and a switch 162 selectively to ground terminal 164 for normal operation or to low impedance feedback terminal 166 which is coupled to the phase comparator circuit 56 which will be hereinafter further described. The line 158 is also coupled through an RF choke 168 and an RF rejecting filter comprised of an inductor 170 and capacitor 172 to ground. The RF choke 168 is also coupled to a break-point network 174 comprised of a potentiometer 176 from the center tap to one side of which is coupled a diode 178. The other side of the diode 178 and potentiometer resistor 176 is coupled through a resistor 180 to ground. The output of the break-point circuit 174 is coupled to control grid 182 of a dual envelope triode 184.

The other side 186 of the output line 42 is coupled through a balanced resistor 188 to ground and through an RF choke 190 and an RF rejection filter comprised of inductor 192 and capacitor 194 to ground. The RF choke 190 is also coupled through a break-point network 196 to a low impedance bias point 198. The break point network 196 consists of a resistor 200 in series with a diode 202 and a potentiometer 204.

The low impedance bias point 198 is coupled through a cathode resistor 206 to a cathode 208 of the dual triode 184 and through a grounding resistor 210 to ground. Resistors 206 and 210 provide the bias for the left section of triode 184 and the low impedance bias point 198.

The output of the break point network 196 is coupled through line 212 to control grid 214 of the right side triode in the dual envelope triode 184. The right side triode of the dual triode 184 has a cathode 216 coupled through a potentiometer 218 to ground and an anode 220 coupled through voltage divider resistors 222 and 224 to B+. One side 226 of the output line 46 is coupled to a point between the voltage divider resistors 222 and 224.

The left side triode of the dual triode 184 has an anode 228 coupled through voltage divider resistors 230 and 232 to B+. The other side 234 of the output line 46 is coupled to a point between the voltage divider resistors 230 and 232. Output line 46 applies a bias between lines 226 and 234 to the electronically tunable filter 48 described in connection with FIG. 1 and to be hereinafter further described.

Input line 24 from the IF amplifier is also coupled through line 22 and resistor 236 to the delay circuit 52 and through a tuning inductor 238 for the input delay circuit 52 to ground. The output line 50 of the delay circuit 52 is also coupled through an output tuning inductor 240 to ground and coupled through a phase shifting network 242, comprised of a resistor 244 and capacitor 246 in parallel, to a control grid 248 of an RF pentode 250 in the electronically tunable filter 48. The pentode 250 has a suppressor grid 252 coupled back to a cathode 254 which is also coupled through a grounding resistor 256 to ground. The pentode 250 also has a screen grid 258 coupled through bypass capacitors 260 and 262 to ground, and through a resistor 264 to B+. The pentode 250 also has an anode 266 coupled to a center tap 268 on a high Q inductor 270 across which is coupled a tuning capacitor 272. One side of the inductor 270 is coupled to B+ and the other side is coupled through a coupling capacitor 274 and line 58 to one input of the phase comparator 56, the other input of which is coupled through line 54 to the line 50 between the delay circuit 52 and phase shift network 242. Inductor 270 is also coupled through a coupling capacitor 276 to a point 278 to which is coupled the phase shaping output line 226 through an RF choke 280 and to one side of a tuning varactor 282, the other side of which is coupled to the other output line 234. Line 26 is also coupled through an audio balancing capacitor 284 to ground. Output line 234 is also coupled through a bypass capacitor 286 to ground.

Point 278 is also coupled through coupling capacitor 288 to a control grid 290 of a pentode 292 in the subtracting circuit 28, and through a grid leak resistor 294 to ground. The pentode 292 also has a suppressor grid 296 tied back to a cathode 298 which is grounded through a resistor 300 and a capacitor 302.

The pentode 292 also has a screen grid 304 coupled through a capacitor 306 to ground and through a resistor 308 to B+. The pentode 292 also has an anode 310 connected to a high impedance double tuned plate circuit 312 comprised of a parallel tuned inductor and capacitor 314 and 316 respectively and a tuned parallel inductor and capacitor 318 and 320 respectively separated by a coupling capacitor 322. The anode 310 is also coupled through line 34 to an anode 324 of a pentode 326 in the linear wide-band gain amplifier 30.

The pentode 326 also has a suppressor grid 328 tied back to a cathode 330 which is coupled through a potentiometer 332 to ground and through a capacitor 334 to ground and through a capacitor 336 to a screen grid 338 which is coupled through a resistor 340 to B+. The pentode 326 also has a control grid 342 coupled through a grid leak resistor 344 to ground and through line 32 to line 50 between the delay line 52 and the phase shift network 242.

The secondary side of the double tuned circuit 312 is coupled through line 66 to a control grid 346 of a limiter pentode 348 in the first limiter stage of the final demodulator 14 which may be identical in construction to the stronger signal demodulator 38 except in that one side of the discriminator 350 of the final demodulator 14 is grounded through a line 352 and the audio amplifier output line 68 is coupled to a potentiometer 354 in the discriminator 350.

Input line 58 is also coupled through grid leak resistor 357 to ground and to a control grid 356 of an RF pentode 358 also having a suppressor grid 360 which is tied back to a cathode 362 which is coupled through a potentiometer 364 to ground and through a capacitor 366 to ground. The RF pentode 358 also has a screen grid 368 which is coupled through a capacitor 371 to ground and through a resistor 370 to B+.

The RF pentode 358 also has a plate 374 coupled to a double tuned transformer 376, the tuned secondary 378 of which is coupled to a control grid 380 of an RF pentode 382 forming a second amplification stage 384 with associated circuitry similar to the first amplification stage just described in connection with the pentode 358 and its associated circuitry.

A tuned secondary 386 in the second amplifier stage 384 is coupled through line 388 to one input point 389, of an RF phase comparator bridge 390, between capacitors 392 and 394 across which is coupled divider resistors 396 and 398 forming a balanced integrator circuit 400. One side of the integrator circuit 400 is coupled through a diode 402 to one side of a tuned secondary 404 of a balanced input transformer 406, the other side of which is coupled through another diode 408 to the other side of the balanced integrator circuit 400. Also the balanced integrator circuit 400 has coupled across it an adder resistor chain 412, the adding point 414 of which is coupled through an output line 416 to a control grid 418 of a cathode follower 420 having a plate coupled to B+ and cathode 422 coupled to the output line 60 and through a cathode resistor 424 to ground.

The balanced input transformer 406 has a tuned primary 426 one side of which is coupled through a line 428 to an anode 430 of an amplifier pentode 432 having a screen grid 434 coupled through a resistor 436 to the other side of the tuned primary 426 and to B+ as well as through a bypass capacitor 438 to ground. The amplifier pentode 432 also has a suppressor grid 440 tied back to a cathode 442 which is coupled through a resistor 444 to ground and through a capacitor 446 to ground. The amplifier pentode 432 also has a control grid 448 coupled through a grid leak resistor 450 to ground and to the input line 54.

In the operation of the FIG. 2 embodiment the undesired stronger interference signal 62 and the desired information signal 64 appear through line 40 at the control grid 70 of the first limiter stage 96 in the demodulator 28. Amplitude limiting of the combined signals 62 and 64 is provided in the back-to-back diode configuration 94 because the diodes in the configuration 94 are silicon diodes within this instance approximately ½ volt offset. The average capacity of the limiter diodes in the back-to-back diode configuration 94 is tuned out by the inductor 92. The constant amplitude output from the diode configuration 94 is fed to the control grid 100 of the similar limiter stage 106 which in similar manner further limits amplitude to produce a uniform output at the control grid 110 of the pentode 112 in the discriminator driver circuit 116.

The output of the discriminator driver 116 appears through the discriminator transformer 136 at the filter circuit 152 which has an output characteristic illustrated by the line 156 in FIG. 3. The transformer 136, diodes 140 and 142, and filter 152 with associated circuitry form a wide band discriminator which has a high capture effect suppressing substantially completely the weaker signal 64 such that the output across lines 158 and 186 is essentially the modulation of only the stronger signal 62. It should be understood that while the limiter stages 96 and 106 shown herein are of the wide band variety, somewhat higher capture effect may be obtained by the use of conventional narrow band limiters if desired. The output across lines 158 and 186, due to resistors 188 and 160, is always balanced to ground. The modulation voltage signal 156 (FIG. 3) appearing across output lines 158 and 186 is delivered through the break point circuits 174 and 196 to the control grids 182 and 214 respectively in the dual triode 184.

Figure 4:
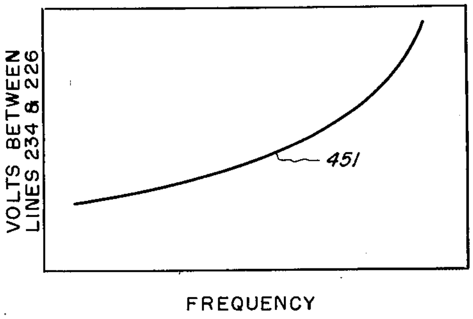
Figure 5:
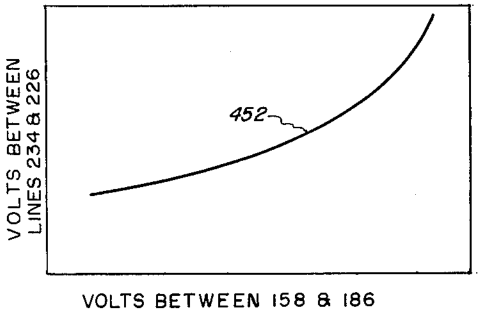
Figure 6:
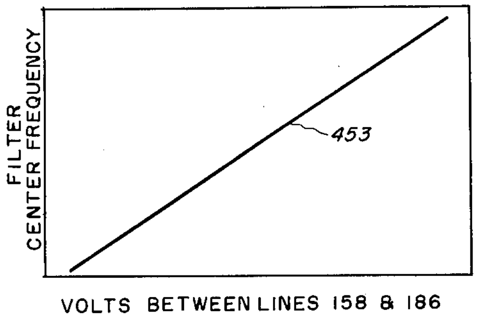
Figure 7:
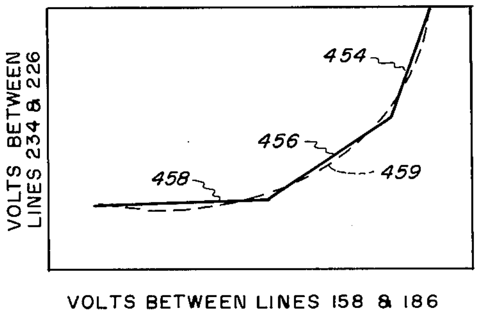

The break point circuits 174 and 196 shape the output demodulator voltage 156 in accordance with curve 451 FIG. 4 which shows the tuning characteristic of the electronically tunable filter 48. Curve 452 in FIG. 5 shows the ideal compensating non-linearity for the analog shaping circuit 44 in order to provide a linear voltage to frequency conversion from the voltage between lines 158 and 186 and the center frequency of the electronically tuned filter 48. Curve 453 in FIG. 6 illustrates the resulting overall tuning characteristic of the center frequency of the electronically tunable filter 48 with respect to the voltage across lines 158 and 186. Lines 454, 455 and 456 in FIG. 7 illustrate a practical three-segmented approximation 459 of the ideal compensating characteristics shown by curve 452 in FIG. 5 and created as hereinafter described.

The discriminator output voltage is herein defined as the voltage of line 158 with respect to line 186, as shown by the linear line 156 in FIG. 3, is balanced with respect to ground and drives the grids 182 and 214 respectively of the dual triodes 184 which constitute a balanced amplifier. However, at each grid 182 and 214 there is a break point circuit 174 and 196 respectively to accomplish a required predistortion approximating curve 452 in FIG. 5 and shown in its practical realization by the three linear segments 454, 456 and 458 in FIG. 7. For discriminator voltages as defined above, which are small, near zero, both break point diodes 178 and 202 respectively are open and the gain of the analog shaping circuits 44 is constant over some range of discriminator output voltages centered about zero.

This gain can be varied by adjustment of potentiometer 218 as the discriminator output voltage 156 is increased, diode 178 closes at some point. This then increases the stage gain for discriminator voltages above this break point. Diode 202 remains open. The amount of gain increase is controllable by the setting on potentiometer 176. The diode 178 is preferably a silicon diode having a built-in ½ volt delay which effectively holds it open for voltages below the break point. On the other hand, diode 202 is preferably a germanium diode whose break voltage is determined by the delay voltage at 198 as set on the potentiometer 210.

As the discriminator output voltage 156 decreases below the zero line 460 the diode 202 closes at some point resulting in an increase in stage gain for more negative discriminator output voltages and this gain is varied by the potentiometer 204. The resulting overall characteristic then is a three-segmented approximation shown in FIG. 7 by the segments 154, 156, and 158 respectively as an approximation to the desired ideal curvature 452 shown in FIG. 5.

The reason for running the analog shaping circuit 44 as a balanced system is to insure minimum drift to accommodate for D.C. discriminator voltages. The output circuitry of the balanced amplifier 184 which includes voltage divider resistors 232, 230, 224, and 222 respectively are arranged to allow the guidance voltage shown in FIG. 7 to be impressed on the varactor 282 in the electronically tunable filter 48 with sufficient frequency response to accommodate the highest expected rates of the undesired signal 62 modulation. The voltage divider resistors 232, 230, 224, and 222 respectively are necessary because of the capacitive nature of varactor 282 and associated circuitry as a load.

The guidance voltage shown in FIG. 7 is impressed across the varactor 282 through the lines 234 and 226 respectively. In series with line 226 there is an RF choke 280 provided to insure that the output impedance of the analog shaping circuit 44 does not constitute a low impedance at the IF frequency which would thereby lower the Q of the varactor 282. Capacitor 284 is provided to balance the frequency response of the two lines 234 and 226. The varactor 282 appears as a tunable capacitor across the high Q tank circuit, consisting of high Q inductor 270 and fixed tuning capacitor 272. Since one side of the tank circuit 271 is tied to ground, it is necessary to RF ground one side of the varactor 282 which is accomplished by means of the capacitor 286.

Simultaneously with the undesired stronger signal 62 and the desired weaker signal 64 appearing as described in the demodulator 38 they appear through line 22 and resistor 236 through a delay circuit 52 and the phase shift network 242 at the control grid 248 of the electronically tunable filter 48. The amount of delay in the delay line 52 is so selected as to delay both signals 62 and 64 by an amount of time which will accomplish a time coincidence in the electronically tunable filter 48 of the instantaneous frequency of the signal 62 and the instantaneous center frequency of the tunable filter 48. This will thereby provide a constant gain for the signal 62 and the signal 62 will be faithfully reproduced at the output line 26 to the control grid 290 of the subtractor circuit 28.

However, because of the high Q nature of the electronically tunable filter 48 and the statistical independence of the frequency locations of signals 62 and 64 at a given instant, the electronically tunable filter 48 will essentially provide no gain for the signal 64.

Phase shifter 242 compensates for small amounts of phase shift caused by subsequent circuitry in the electronically tunable filter 48 which does not appear in the linear gain amplifier. It should be noted here that in the FIG. 2 embodiment only one delay line 52 is shown and used whereas in the FIG. 1 embodiment, for the sake of clarity of explanation, two delay lines 52 and 31 were shown. The combined signals 62 and 64 in the output line 50 from delay line 52 in the FIG. 2 embodiment will appear simultaneously through line 32 at the control grip 342 of the linear gain amplifier 30 and thereby, suitably amplified, will appear in output line 34 in the subtractor circuit 28.

The operation of subtraction in the subtractor circuit 28 is obtained by phase shifting one of the signals, in this instance the signal 62 appearing in line 26, by 180° with respect to itself by the use of the pentode 292 and then adding to the output of the phase shift pentode 292 the output from the linear gain amplifier 30 appearing in line 34 by providing the same plate load for both pentodes 292 and 326 in the form of the double tuned circuit 312.

Because of the broadband nature of the double tuned circuit 312, the subtraction operation can be accomplished over a very wide band. Thus, output line 66 carries essentially the desired signal 64 alone having achieved substantially complete cancellation of the undesired signal 62 in the subtractor circuit 28.

The desired signal 64 is then passed through line 66 to the control grid 346 of the final demodulator 14 which suitably demodulates the desired signal 64. The desired demodulated output of the desired signal 64 is then fed through output line 68 to an audio amplifier and other use circuitry (not shown).

Had the desired signal 64 been an AM signal, the final demodulator 14 would have been an AM demodulator. In the present instance an FM demodulator is shown for illustrative purposes in view of our description having been in connection with a frequency modulation desired signal 64.

The previous description has been undertaken exclusive of the use of the phase shift comparator 56 which may be used in those instances where highly refined output is desired. However, even without the phase comparator 56, at the output line 66 of the subtractor circuit 28 the ratio of the intensity of the undesired signal 62 to the desired signal 64 would have dropped as much as 30 db. It should be noted that it is not necessary to bring the ratio of the undesired signal 62 to the desired signal amplitude 64 to zero since it is only necessary to bring the ratio down to slightly below unity because the capture effect of the final demodulator 14 is such that it will further depress any remaining signal 62 appearing in line 66 to thereby provide in output line 68 a substantially clean reproduction of the modulation on signal 64. Therefore, desired signal 64 at the input line 24 even though as much as 30 db weaker than the undesired interfering signal 62, may nevertheless be clearly intelligible in output line 68. Capture effect as herein used refers to the inherent characteristic of conventional radio receiver equipment to cause the stronger of two simultaneously received signals to dominate the weaker signal and is discussed and illustrated in substantial detail in Patent No. 3,020,403 issued February 6, 1962.

It should be noted that conventional type receivers give essentially no information from a desired weaker signal 64 in the presence of an interfering signal 62 which has an amplitude ratio of greater than unity with respect to the desired signal 64.

Still further refinement and greater recoverability of a weak desired signal 64 may be obtained by the use of the phase comparator 56 which may be inserted into the overall circuit by closing the switch 162. Thereupon the phase comparator 56 compares the phase of the undesired signal 62 before and after the electronically tunable filter 48 appearing in lines 54 and 58 respectively. Any phase difference indicates an error in the tracking in the electronically tunable filter 48 and generates thereby by means of the phase comparator 56 a correction signal in line 60 which is applied to the signal appearing in line 158 in such manner as to provide an output signal in lines 226 and 234 which compensate for the compared error at the electronically tunable filter 48. The requirements on the phase comparator 56 are such that upon comparing the phase of the input signals appearing from lines 58 and 54 provides an output signal in line 60 proportional to the phase difference between the input signals appearing in lines 54 and 58.

It is further necessary that the output correction signal voltage in line 60 be dependent only upon the phase differential and not upon the frequency of the signals and this must be true over the entire operating bandwidth of the IF system for effective operation. The output in line 60 must be either positive or negative, symmetrical about the zero phase condition. The basic RF phase comparator bridge 390 has two inputs, point 388 and the transformer 406 and is symmetrical about the ninety degree phase condition. This may be converted to symmetry about the zero degree phase condition by double tuning the balanced input transformer 406 which picks up another ninety degrees of phase shift. This introduces a frequency dependence into the phase shift comparator's operation since the phase shift of the double tuned circuit 406 is ninety degrees only at the center frequency and has a more or less linear slope with frequency. In order to preserve the frequency insensitivity of the device a similar slope may be incorporated into the reference input at 388 but with symmetry about the zero degrees phase point. This is accomplished by compensating with two tandem double tuned filters comprised of tuned transformer 376 in the plate circuit of the first amplifier stage 358 and the similar tuned transformer in the second amplifier stage 384 and choosing the damping coefficient or Q's to provide the same time delay as in the branch having the single filter 406. The result is a phase measuring device with the desired phase response characteristics.

While the present illustrative embodiment has been described in connection with frequency modulation signals 62 and 64, it should be noted that the same principles of operation are also applicable to receivers for continuous wave, amplitude modulation or pulse type information signals where the desired information signals are the weaker of two incoming signals and where the stronger interfering signal 62 is a frequency modulation, phase modulation or continuous wave signal. Inasmuch as phase modulation and continuous wave signals are in fact only special cases of frequency modulation signals, they may be effectively eliminated by the same equipment and in the same manner as described in connection with FIGS. 1 and 2.

The invention is also applicable where the stronger interfering signal 62 is an amplitude modulation signal. Where the stronger interfering signal 62 is an amplitude modulation signal, the limiter stages 96, 106 and 136 in the demodulator 38 cut off the amplitude modulation leaving substantially only the carrier signal so that the output in lines 158 and 190 of the demodulator 38 bias the varactor 282 in the electronic filter 48 to effectively pass the carrier through line 26 to the subtraction circuit 28 to which the carrier is also brought through line 34 from the linear gain amplifier 32 so as to cancel out the interfering carrier signal 62 and pass the weaker desired information signal 64 in manner to that described above in connection with frequency modulation signals. While amplitude modulation side bands are not eliminated, nevertheless the desired weaker signal becomes intelligible where it would not have been without removing the carrier of the interfering amplitude modulation signal.

It will be noted that the above explanation is confined to those instances where the stronger signal 62 is of a type other than frequency modulation. In the case of the weaker signal 64, the present invention does not depend in its operation nor place any special requirements upon the type of modulation of the weaker signal 64, nor does it distort or otherwise deteriorate the weaker signal. The only requirement of the present invention for extracting a weaker signal 64 of any desired modulation is that the final demodulator 14 be of a type suited to the particular modulation of the weaker signal 64. For example, in the event of the weaker signal 64 being an amplitude modulation signal, the final demodulator 14 would be an amplitude modulation demodulator rather than the freqeuncy modulation demodulator shown schematically in the illustrative embodiment in FIG. 2 for operation with the previously mentioned frequency modulation weaker signal 64. Working embodiments of the present invention have in actual operation demonstrated that the invention operates effectively to extract the weaker signal 64 whether it be frequency or amplitude modulation, with pulse type information signals being classed as a special type of amplitude modulation signal.

This invention is not limited to the particular details of construction and operation herein described as equivalents will suggest themselves to those skilled in the art.

What is claimed is:

1. In a bridge type system for cancelling the stronger of two radio frequency signals, the combination of an interference signal tracking filter means in the path of the two radio frequency signals for isolating the stronger signal, a linear gain amplifier in the path of the two radio frequency signals, and signal subtracting means arranged for subtracting the output of the tracking filter from the output of the amplifier.

2. The combination as in claim 1 wherein the signal tracking filter means includes an electronically tunable narrow band filter, and demodulator means in responsive relation to the stronger signal and in control relation to the filter.

3. The combination as in claim 1 wherein the stronger signal tracking filter means includes a narrow band electronically tunable filter, and control signal means coupled in control relation to the filter, the control signal means including a demodulator arranged for demodulating the stronger signal, and a signal shaping circuit in the path of the demodulated signal for forming a tuning control signal.

4. In a bridge type system for cancelling the stronger of two radio frequency signals, the combination of an interference signal tracking filter means in the path of the two radio frequency signals for isolating the stronger signal, a linear gain amplifier in the path of the two radio frequency signals, signal subtracting means arranged for subtracting the output of the tracking filter means from the output of the amplifier, and a phase comparator feedback circuit coupled to the interference signal tracking filter means for supplying corrective feedback control to the filter means.

5. In a radio frequency signal receiver, the combination of an intermediate frequency amplifier, a narrow-band electronically tunable filter arranged for receiving the signal output of the intermediate frequency amplifier, means coupled in responsive relation to the intermediate frequency amplifier and in control relation to the filter for continuously tuning the filter to pass a selected frequency output of the intermediate frequency amplifier, a signal subtracting circuit coupled to receive the output of the narrow-band filter, means coupled to the intermediate frequency amplifier and subtracting circuit for applying the output of the intermediate frequency amplifier to the subtracting circuit, and demodulator means coupled to the subtracting circuit for demodulating the subtracted output of the subtracting circuit.

6. In a radio frequency signal receiver, the combination of an intermediate frequency amplifier, a narrow-band electronically tunable filter arranged for receiving the signal output of the intermediate frequency amplifier, an analog voltage circuit coupled in responsive relation to the predominant frequency signal output of the intermediate frequency amplifier and in control relation to the filter for continuously tuning the filter to the frequency of the predominant frequency signal, a signal subtracting circuit coupled to receive the output of the narrow-band filter, means coupled to the intermediate frequency amplifier and subtracting circuit for applying the output of the intermediate frequency amplifier to the subtracting circuit, and demodulator means coupled to the subtracting circuit for demodulating the subtracted output of the subtracting circuit.

7. The combination as in claim 6 wherein the analog voltage means includes a phase comparator for providing correction voltages in response to signal phase discrepancies at the subtracting circuit.

8. The combination as in claim 6 wherein the analog voltage circuit includes a demodulator for demodulating the predominant frequency signal output of the intermediate frequency amplifier, and an analog shaping circuit for changing the demodulated signal to effect linear tuning response of the narrow band filter with respect to demodulated signal.

9. The combination as in claim 6 wherein a signal delay means is provided in one of the circuits to the subtracting circuit to provide substantial coincidence of corresponding signals reaching the subtracting circuit.

References Cited by the Examiner

UNITED STATES PATENTS

| | | | |
|---|---|---|---|
| 2,923,814 | 2/1960 | Smith-Vaniz | 325—475 |
| 3,092,776 | 6/1963 | Castellini | 325—474 |

DAVID G. REDINBAUGH, *Primary Examiner.*